United States Patent [19]

Pullukat et al.

[11] Patent Number: 5,895,770
[45] Date of Patent: Apr. 20, 1999

[54] OLEFIN POLYMERIZATION CATALYSTS WITH SPECIFIC SILICA SUPPORTS

[75] Inventors: Thomas J. Pullukat, Lansdale, Pa.; Carl A. Gillings, Newark, Del.; Reinhard H. Witt, Wyncote, Pa.

[73] Assignee: PQ Corporation, Valley Forge, Pa.

[21] Appl. No.: 08/822,453

[22] Filed: Mar. 21, 1997

Related U.S. Application Data

[63] Continuation-in-part of application No. 08/396,419, Feb. 28, 1995, abandoned.

[51] Int. Cl.$^6$ .................. B01J 21/08; B01J 21/12; B01J 21/14; C08F 4/02
[52] U.S. Cl. .................. 502/103; 502/232; 502/233; 502/234; 502/238; 502/242; 502/246; 502/351; 502/252; 502/256; 502/263; 502/120; 502/117
[58] Field of Search .................. 502/120, 242, 502/246, 251, 256, 232, 233, 234, 238, 252, 263

[56] References Cited

U.S. PATENT DOCUMENTS

| | | | |
|---|---|---|---|
| 3,081,154 | 3/1963 | Acker et al. | 502/232 |
| 3,784,539 | 1/1974 | Ort | 260/94.9 C |
| 3,787,384 | 1/1974 | Stevens et al. | 260/94.9 D |
| 3,960,826 | 6/1976 | Aboutboul et al. | 526/103 |
| 3,978,002 | 8/1976 | Aboutboul et al. | 252/456 |
| 4,053,435 | 10/1977 | Lynch | 252/451 |
| 4,053,565 | 10/1977 | Krekeler et al. | 252/451 |
| 4,175,170 | 11/1979 | Schweler et al. | 526/125 |
| 4,472,531 | 9/1984 | Speca et al. | 502/256 |
| 4,689,315 | 8/1987 | Anton et al. | 502/232 |
| 4,701,432 | 10/1987 | Welborn et al. | 502/113 |
| 4,849,390 | 7/1989 | Sano et al. | 502/102 |
| 4,940,682 | 7/1990 | Sasaki et al. | 502/120 |
| 4,983,694 | 1/1991 | Furtek | 502/102 |
| 5,057,475 | 10/1991 | Canich et al. | 502/120 |
| 5,155,079 | 10/1992 | Cribbs et al. | 502/120 |
| 5,189,000 | 2/1993 | Masi et al. | 502/120 |
| 5,198,400 | 3/1993 | Katzen et al. | 502/120 |
| 5,599,887 | 2/1997 | Badley et al. | 502/256 |
| 5,654,249 | 8/1997 | Rollmann et al. | 502/120 |
| 5,710,093 | 1/1998 | Rivas et al. | 502/242 |

FOREIGN PATENT DOCUMENTS

| | | |
|---|---|---|
| 0 638 359 | 2/1995 | European Pat. Off. . |
| 28 31 828 | 2/1980 | Germany . |
| 28 46 185 | 5/1980 | Germany . |

OTHER PUBLICATIONS (1) Max P. McDaniel, "Fracturing Silica-Based Catalysts During Ethylene Polymerization", J. Polymer Sci.: Polymer Chem. Ed., vol. 19, pp. 1967–1976.
(2) The PQ Corporation, "Silica Catalysts," Bulletin SC-101.
(3) The PQ Corporation, "PQ Polyolefin Catalysts," Bulletin SC-102.

*Primary Examiner*—Mark L. Bell
*Assistant Examiner*—J. Pasterczyk
*Attorney, Agent, or Firm*—Ratner & Prestia

[57] ABSTRACT

A transition metal containing catalyst having a silica-support is provided for the production of polyolefins from α-olefins that can be converted to polymer films, preferably thin films of polyolefin, which have lower defects resulting from a decreased presence of silica-containing residues from the catalyst. The catalyst has a porous silica support component and a catalytic component which may include, but is not limited to, such materials as chromium, magnesium-titanium (Ziegler-Natta type) or metallocene compounds (Metallocene catalyst type). The porous silica component of the catalyst has an average pore volume of from about 2.5 to about 3.5 ml/g and a surface area of 200 to 400 m$^2$/g and preferably 250 to 350 m$^2$/g. The average pore diameter ranges from about 285 to about 700 Angstroms and preferably 500–700 Angstroms for porous silica components having surface areas of 200 m$^2$/g and preferably 285–400 Angstroms for porous silica components having surface areas of 350 m$^2$/g. Preferably, the average particle size of the silica component may range from 44 to about 150 microns in diameter.

16 Claims, No Drawings

OLEFIN POLYMERIZATION CATALYSTS WITH SPECIFIC SILICA SUPPORTS

This patent application is a continuation-in-part application of application Ser. No. 08/396,419 filed Feb. 28, 1995, now abandoned.

FIELD OF THE INVENTION

This invention relates to olefin polymerization catalysts with special silica supports. The polyolefin produced can be formed into very thin layers.

BACKGROUND OF THE INVENTION

Silica-supported catalysts for use in the polymerization of ethylene, propylene, and the copolymerization of ethylene with 1-butene, 1-hexene, 1-octene, and other alkenes are well-known. One type of these silica-supported catalysts is the thermally-activated chromium catalysts disclosed in U.S. Pat. No. 2,825,721 which are commonly called Phillips Catalysts. Another type is the silica-supported Ziegler-Natta catalysts which generally are activated by the addition of an aluminum alkyl compound. Among the silica supported Ziegler-Natta catalysts, for example, are: those formed from magnesium and titanium compounds as disclosed in U.S. Pat. No. 3,787,384; organoaluminum and vanadium compounds disclosed in U.S. Pat. No. 3,784,539; those formed from more than one transition metal compound such as zirconium and vanadium disclosed in U.S. Pat. No. 5,155,079; and those made with metallocene compounds disclosed in U.S. Pat. Nos. 4,701,432 and 5,057,475.

The polyolefins that are made with silica-supported catalysts are suitable for many applications, including injection molding and injection blow molding of thick walled bottles and other containers. However, it has been difficult to fabricate acceptable thin-layer products. For example, blown films are often unacceptable because of the presence of particles which have been identified as silica-containing catalyst residues. Thin coatings on electrical objects, such as wires and cables have been found to have electrical defects caused by residual silica particles in the coatings. These defects, known as "gel defects," are a serious problem in the industry.

While the prior art is replete with specifying the required physical properties of silicas as support for catalysts for the polymerization of olefins, there seems to be no recognition that defect-causing particles can be eliminated or greatly reduced in number and size by the use of silica with specific pore sizes. Illustrative examples of the prior art follow.

U.S. Pat. No. 3,960,826 discloses a catalyst prepared with silica xerogel support having a pore volume greater than 2.00 ml/g and a narrow pore size distribution between 300 to 600 Angstroms. The xerogel is intended for use in a particle form polymerization process to provide polyethylene resins of increased melt index values. There is no recognition by the patentees that silica with 200–400 $m^2/g$ surface area and 2.5–3.5 ml/g pore volume are well suited for making catalysts that produce polyethylene suitable for thin layer application.

U.S. Pat. No. 4,983,694 discloses olefin polymers having melt flow ratios of 25 to 50 produced with supported catalysts, the support having average pore diameters of 20 to 300 Angstroms, wherein the catalyst particle size is kept constant. The catalyst-produced polymers had gradually decreasing molecular weight distribution with decreasing pore size of the catalyst at a constant particle size. It appears that this discovery can serve as a means to regulate the molecular weight distribution of polyolefins through the physical characteristics of the silica. However, there is no recognition by the patentees to decrease the prevalence of the defect-causing catalyst particle residues in the so-produced polymers.

U.S. Pat. No. 4,849,390 describes catalyst characteristics required to increase the bulk density of polyolefin resins, to control or eliminate the formation of dust particles, and to improve the dry flow of the particles produced by the polymerization process. According to the patent, these improvements can be obtained by using a silica with large amounts of nearly spherical particles having an average pore size of 180 to 250 Angstroms in diameter, with more than 60% of the pore size being in the range of 100 to 300 Angstroms, and a degree of resistance to disintegration by treatment of the catalyst with ultrasonic waves. As a result, this patent teaches away from the use of silica which is more susceptible to disintegration upon exposure to ultrasonic waves.

U.S. Pat. No. 4,175,170 discloses a process for the manufacture of homopolymers and copolymers of alpha-mono olefins. The process includes the use of a finely divided inorganic oxide material which has a particle diameter of from 1 to 1,000 microns, a pore volume of from 0.3 to 3 ml/g, and a surface area of from 100 to 1,000 $m^2/g$. These ranges include silica types which appear to be unsuitable for polyolefin processes especially those processes which produce polyethylene especially geared for thin layer applications.

SUMMARY OF THE INVENTION

The present invention provides silica-supported catalysts for the polymerization of α-olefins to produce polyolefins which have lower defects resulting from a decrease in the size of silica-containing residues from the catalysts. The polyolefin resins manufactured using the catalysts of the present invention can be formed into shapes having at least one dimension less than about 50 microns. More preferably, the improved polyolefin resins are produced for thin-layer applications such as cable and wire insulation and thin film products wherein one dimension is less than 50 microns and frequently less than 20 microns. Such polyolefins and their uses include: high-density polyethylene having broad molecular weight distribution, which is useful for thin film and wire/cable applications; low molecular weight, narrow molecular weight distribution polymers for application in cast films and extrusion coating; and copolymers of ethylene with an aliphatic olefin used in films, fibers and wire/cable applications.

The present invention also provides silica-supported catalysts of the thermally-activated chromium type, the silica-supported Ziegler-Natta type and Metallocene catalyst type.

The catalysts of the present invention utilize a silica support having the following specific physical property parameters.

Average pore volume: 2.5–3.5 ml/g;

Surface area: 200–400 $m^2/g$; preferably 250–350 $m^2/g$;

Average pore diameter: 250–700 Angstroms and preferably:

for about 200 $m^2/g$ surface area: 500–700 Angstroms;

for about 350 $m^2/g$ surface area: 285–400 Angstroms;

with the Average pore diameter in Angstroms being calculated according to the following equation:

40,000×pore volume/surface area

Average particle size: 20–200 microns in diameter; preferably, 44–150 microns in diameter.

It is to be understood that both the foregoing general description and the following detailed description are exemplary, but are not restrictive, of the invention.

DETAILED DESCRIPTION OF THE INVENTION

In accordance with the present invention, a catalyst having a silica-support is provided for the production of polymers useful for forming polymer films, preferably thin films of polyolefin, which have lower defects resulting from a decreased presence of silica-containing residues from the catalyst.

It is generally known that porous silica catalysts undergo fragmentation when used in a polymerization process. Such fragmentation is described, for example, by M. P. McDaniel, *J. Polym. Sci.*, Polym. Chem. Ed., 1981, 19, 1967. The fragmentation permits diffusion of the long polymer chain-lengths which grow during polymerization inside the pores of the catalyst to several hundred times the length of the pore diameters. It has been recognized in the industry that the polymerization reaction which causes a fracturing of the catalyst also creates and exposes fresh exterior surfaces of the catalyst for propagation of the reaction. In order to be an effective polymerization catalyst, a silica must be fragile enough to undergo fragmentation during the reaction so as to provide sufficient number of fresh sites which maintain the catalysis and polymerization. During fragmentation of the catalyst, however, residual catalyst particles typically remain and can cause defects in the polymerized product. The above-cited publication, however, provides no guidance with regard to optimum physical characteristics of the silica useful in polymerization catalysts to reduce residual defect-causing catalyst particles in the polymerized products which preferably are polyolefins, such as polyethylene, suitable for thin layer applications.

According to the present invention, disclosed are polymerization catalysts with a silica-support designed to reduce residual defect-causing catalyst particles in the polymerized products which, preferably, are used in thin-film polyolefins. It is believed that the improvement obtained by using the catalyst according to the present invention to produce polymer for thin film polyolefin resins is attributable to the elimination, or at least the great reduction of, the number of catalyst residue particles having particle sizes large enough to produce defects. The elimination or reduction of residual catalyst particles is achieved by enhancing the fragmentation ability of the catalyst particles caused by polymerization of the α-olefin within the pore space of the catalyst.

The catalyst of the present invention comprises a porous silica support component with a catalytic component which may include, but is not limited to, such materials as chromium, magnesium-titanium (Ziegler-Natta type) or metallocene compounds (Metallocene catalyst type). Preferably, the catalyst is useful in processes for polymerizing and copolymerizing olefins, such as ethylene, propylene, 1-butene, 1-hexene and 1-octene. The polyolefins are particularly useful for thin layer applications. The porous silica component of the catalyst according to the present invention has an average pore volume of from about 2.5 to about 3.5 ml/g and a surface area of 200 to 400 m$^2$/g and preferably 250 to 350 m$^2$/g. The average pore diameter ranges from about 250 to about 700 Angstroms and preferably 500–700 Angstroms for porous silica components having surface areas of 200 m$^2$/g and preferably 285–400 Angstroms for porous silica components having surface areas of 350 m$^2$/g. With respect to particle sizes, the present inventors have discovered that by using a catalyst having a silica component with smaller particle sizes to produce polymer for thin films, the ability to eliminate defects resulting from the presence of silica-containing residues is enhanced. The average particle size of the silica component may range from about 20 to about 200 microns with from about 44 to about 150 microns in diameter being preferred.

The shape of the particles which make up the silica component may be spherical and/or granular. It is important that the pore volume and pore volume distribution specified above includes substantially all of the particles of the porous silica component. If there are spherical-shaped and granular-shaped particles in a mixture, both types individually must have the specified pore volume and pore volume distribution. The silica component of the present invention may contain up to a total of 5% weight/weight (w/w) of a compound including titanium, aluminum, boron, magnesium or other elements. The silica component of the catalyst of the present invention must contain of from about 60 to about 98% and preferably at least 80% w/w silica, the remaining amount being the catalytic compound. Whether the catalysts are chromium catalysts, magnesium-titanium catalysts, or supported metallocene catalysts, at least 70% of the initial pore volume of the silica support must remain in the catalysts after synthesis or activation.

The silica component which can be incorporated into the catalysts of the present invention may be those available from commercial sources or can be made by art-accepted processes using methods of preparation and purification known in the prior art.

The active catalytic component used in the present invention may include compounds containing elements selected from the transition metal groups IVB, VB and VIB of the Periodic Chart of the Elements and preferably include titanium, vanadium, zirconium and chromium compounds which are known for their use in α-olefin polymerization catalysts.

The catalysts according to the present invention are produced by contacting the silica component discussed above with a transition metal compound in a conventional manner as is known in the art. Preferably the carrier is contacted with a solution of the transition metal compound in a suitable solvent in which the compound is at least partially soluble and which is liquid at reaction temperatures. Such solvents include hexane, heptane, octane, nonane, methanol, toluene, and decane.

The catalysts of the present invention may be used in gas or slurry phase processes, both processes being known by those skilled in the art of polymerizing olefins. The polymerization may be conducted at a temperature in the range of from about 0 to 160° C. or higher and under atmospheric, subatmospheric or superatmospheric conditions. In a slurry polymerization a suspension of solid, particulate polymer is formed in a liquid polymerization medium containing a monomer or monomers, to which hydrogen and a catalyst are added. Solvents used in the polymerization medium include propane, 2-butane, cyclopentane and the like. Gas-phase polymerization processes utilize superatmospheric pressures and temperature ranges of from about 80° C. to about 105° C. The polymerization is performed in a stirred or fluidized bed of catalyst and product particles in a pressure vessel. Monomers, hydrogen and optionally an inert diluent gas, such as nitrogen is introduced into the vessel while maintaining the required temperature range. The formed polymer can be withdrawn continuously. The polymer obtained can be extruded into water and cut into the desired shapes.

An especially preferred catalyst for the polymerization of 1-olefins comprises from about 2 to about 20% w/w of a metallocene compound supported on about 80 to about 98% w/w of a porous silica carrier, said carrier having the above-specified parameters. Metallocene compounds, along with methods of depositing them on porous silica carriers and utilizing them in the polymerization of 1-olefins, are described in U.S. Pat. Nos. 4,701,432 and 5,057,475, which are incorporated herein by reference. They are usually activated by a co-catalyst, e.g., alkyl aluminoxane.

Metallocenes are cyclopentadienyl derivatives of metals which are selected from the group consisting of IVB, VB and VIB metals of the Periodic Table of Elements, preferably titanium, zirconium, hafnium and vanadium. The method of treatment of the carrier is conducted in an inert solvent, such as pentane, iso-pentane, hexane, heptane, cyclopentane, cyclohexane, methanol, and toluene.

Metallocene catalysts are co-catalyzed with an alumoxane for the polymerization of 1-olefins. Alumoxanes are well-known in the art and, for the purpose of the present invention, include those prepared by the hydrolysis of a trialkylaluminum, such as trimethylaluminum, triethylaluminum, tripropylaluminum, triisobutylaluminum, and the like. The preferred alumoxane for this embodiment of the present invention is methylalumoxane (MAO).

The carrier-supported metallocene-alumoxane catalysts are obtained by reacting a metallocene compound and an alumoxane in the presence of the carrier. The reaction is carried out at described in U.S. Pat. No. 4,701,432, which is incorporated herein by reference. The ratio of alumoxane is of from about 1.0 to about 1000 mole of alumoxane per mole of metallocene.

The following examples will further illustrate the essential features of the present invention.

EXAMPLE 1

To evaluate the effect of pore volume on the fragmentation ability of catalysts having silica supports, two silica gel samples with the following physical properties were prepared:

| Sample | Surface Area $m^2/g$ | Pore Volume (ml/g) |
| --- | --- | --- |
| A (comparative) | 300 | 1.6 |
| B (invention) | 300 | 3.0 |

Sample B according to the present invention had an average pore volume of 3.0 ml/g (which is the midpoint of the range of from about 2.5 to about 3.5 ml/g) while Comparative Sample A had a lower average pore volume of 1.6 ml/g which is below the range according to the present invention. Chromium catalysts were prepared from the above silica gels. In order to simulate the fracture of silica catalyst particles which occurs during polymerization, as is known in the art, both catalyst samples were subjected to ultrasound radiation for 70 minutes. The average particle size of Sample A was reduced to 95% of the original size. The average particle size of Sample B was reduced to 42–45% of the original size. Thus, catalyst B having a larger pore volume, according to the present invention, fractured faster than the comparative catalyst A.

EXAMPLE 2

To evaluate the effect of catalysts of the present invention in the production of polyethylene for wire/cable applications, a silica gel support with 345 $m^2/g$ surface area and 3.1 ml/g of pore volume was prepared. An aluminum modified chromium catalyst was prepared by the following procedure. About 995 g of the above silica was placed in a mixer. A solution of 43.8 g of chromium acetate and 413.8 g of an organoaluminum compound was sprayed onto the silica. After thorough mixing the organic solvent was evaporated resulting in a dry powder. The final composition had the following properties:

Surface area=312 $m^2/g$

Pore volume=2.6 ml/g

Cr (%)=1.0

Al (%)=3.6

Average particle size=64 micron

The catalyst was activated in air and used in ethylene polymerization. The polyethylene was found to be exceptionally useful for wire/cable application.

Chromium Comparative Example 3

In order to evaluate the effectiveness of catalysts according to the present invention, a chromium catalyst similar to the one in example 2 was prepared using a silica gel support having a pore volume of 2.93 ml/g but with an increased surface area of 471 $m^2/g$. This comparative chromium catalyst was used to produce polyethylene. This polyethylene was then used for an extruded polyethylene product, the polyethylene showed "gel defects" after extrusion.

EXAMPLE 4

In order to evaluate the effectiveness of the catalysts of the present invention in slurry polymerization, a silica-supported metallocene complex was produced using MS3030, a silica gel having a 300 $m^2/g$ silica surface area and pore volume of 3.0 ml/g silica by the following steps which were performed under a dry nitrogen atmosphere. In a 250 ml 3-neck round bottom flask, equipped with a paddle stirrer, 3.0 g of MS3030 (dried under a nitrogen purge at 150° C., for ten hours), was slurried in 30 ml of toluene. Next, a solution of 0.085 g. of bis (n-butylcyclopentadienyl) zirconium dichloride, $(BuCp)_2ZrCl_2$, dissolved in methylaluminoxane/toluene (2.22 mmol/ml), was added dropwise, with stirring, to the flask. It was stirred for 30 minutes at 60° C. The deep yellow reaction mixture was filtered and the collected solid washed with toluene. The filtrate was colorless, indicating all of the metallocene complex was chemically fixed to the support. The collected solid was dried, under vacuum, at ambient temperature. A yield of 3.9 g of pale yellow powder was obtained. Catalyst activity was 700 g/g cat/hr when tested in an isobutane slurry, at 80° C., with a total reactor pressure of 400 psig.

Although illustrated and described with reference to certain specific embodiments, the present invention is nevertheless not intended to be limited to the details shown. Rather various modifications may be made in the details within the scope and range of equivalents of the claims and without departing from the spirit of the invention.

What is claimed:

1. A silica-containing (α-olefin polymerization transition metal-containing catalyst, useful in the polymerization of α-olefins to polyolefins which exhibit minimal gel defects when extruded into a thin layer of less than 50 microns in thickness, comprising:

a porous particulate silica support component comprising at least 60% w/w silica, said silica support component having the following specific properties:
  a) an average particle size of about 44 to about 150 microns in diameter,
  b) an average pore diameter of about 285 to about 700 Angstroms,
  c) an average pore volume of about 2.5 to about 3.5 ml/g of silica, and
  d) an average surface area of about 200 to about 400 m$^2$/g of silica;

wherein said support includes a catalytic component incorporated thereon.

2. A silica-containing α-olefin polymerization catalyst according to claim 1 wherein said silica support has a surface area of about 200 m$^2$/g and an average pore diameter of about 500 to about 700 Angstroms.

3. A silica-containing α-olefin polymerization catalyst according to claim 1 wherein said silica support has a surface area of about 350 m$^2$/g and an average pore diameter of about 285 to about 400 Angstroms.

4. A silica-containing α-olefin polymerization catalyst according to claim 1 wherein said particles of said silica support have a configuration selected from the group consisting of spherical and granular.

5. A silica-containing α-olefin polymerization catalyst according to claim 1 wherein said silica support comprises up to 5% of a member selected from the group consisting of titanium, aluminum, boron, magnesium, and combinations thereof.

6. A silica-containing α-olefin polymerization catalyst according to claim 5 wherein said silica support comprises at least 80% w/w silica.

7. A silica-containing α-olefin polymerization catalyst according to claim 1 wherein said catalytic component is a compound of an element selected from the group consisting of the transition metal groups IVB, VB and VIB.

8. A silica-containing α-olefin polymerization catalyst according to claim 7 wherein said compound is selected from the group consisting of titanium, vanadium, zirconium and chromium compounds.

9. A silica-containing α-olefin polymerization catalyst according to claim 1 wherein said catalytic component is selected from the group consisting of a Ziegler-Natta catalyst and a metallocene catalyst.

10. A silica-containing α-olefin polymerization catalyst according to claim 9 wherein said Ziegler-Natta catalyst comprises magnesium and titanium.

11. A silica-containing α-olefin polymerization catalyst according to claim 9 wherein said polymerization catalyst comprises from about 2 to about 20% w/w of a metallocene compound.

12. A silica-containing α-olefin polymerization catalyst according to claim 9 wherein said metallocene catalyst comprises a cyclopentadienyl derivative of a metal selected from the group consisting of the Group IVB, VB and VIB metals.

13. A silica-containing α-olefin polymerization catalyst according to claim 12 wherein said metal is selected from the group consisting of titanium, zirconium, hafnium and vanadium.

14. A silica-containing α-olefin polymerization catalyst according to claim 9 wherein said metallocene catalyst is co-catalyzed with an alumoxane.

15. A silica-containing α-olefin polymerization catalyst according to claim 14 wherein said alumoxane is produced by the hydrolysis of a trialkylaluminum selected from the group consisting of trimethylaluminum, triethylaluminum, tripropylaluminum, and triisobutylaluminum.

16. A silica-containing α-olefin polymerization catalyst according to claim 15 wherein said alumoxane is methylalumoxane (MAO).

* * * * *

UNITED STATES PATENT AND TRADE MARK OFFICE
CERTIFICATE OF CORRECTION

PATENT NO.     : 5,895,770
DATED          : April 20, 1999
INVENTOR(S)    : Thomas J. Pullukat et al.

It is certified that error appears in the above-identified patent and that said Letters Patent is hereby corrected as shown below:

On the cover of the patent, at "[57] ABSTRACT", in the penultimate line of the paragraph, delete "from 44", insert --from about 44--.

At column 6, claim 1, line 63, before "α-olefin", delete "(".

At column 7, claim 5, line 28, after "5%", insert --w/w--.

Signed and Sealed this

First Day of February, 2000

Attest:

Q. TODD DICKINSON

*Attesting Officer*     *Acting Commissioner of Patents and Trademarks*